United States Patent
Fujita

(10) Patent No.: US 7,065,071 B2
(45) Date of Patent: Jun. 20, 2006

(54) POINT-TO-POINT PROTOCOL TERMINATION DEVICE

(75) Inventor: Yoshitaka Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 1071 days.

(21) Appl. No.: 09/934,840

(22) Filed: Aug. 23, 2001

(65) Prior Publication Data

US 2002/0046280 A1  Apr. 18, 2002

(30) Foreign Application Priority Data

Aug. 23, 2000  (JP) .............................. 2000-252443

(51) Int. Cl.
*H04L 12/28* (2006.01)
(52) U.S. Cl. .................. 370/352; 370/395.65; 370/401
(58) Field of Classification Search ................ 370/351, 370/395.31, 395.52, 395.53, 395.6, 399, 370/401, 409
See application file for complete search history.

(56) References Cited

U.S. PATENT DOCUMENTS 6,118,785 A * 9/2000 Araujo et al. ................ 370/401
6,667,971 B1 * 12/2003 Modarressi et al. ......... 370/352

FOREIGN PATENT DOCUMENTS

JP          10-322399          12/1998

* cited by examiner

*Primary Examiner*—Huy D. Vu
*Assistant Examiner*—Daniel Ryman
(74) *Attorney, Agent, or Firm*—Young & Thompson

(57) ABSTRACT

A PPP termination device allowing PPP termination at a location where a decreased number of subscriber's signals are multiplexed is disclosed. The PPP termination is performed in an access gateway including a switch in the access network system. The access gateway includes a first interface to a DSLAM, a second interface to a backbone network, and a header processor for converting between a network-layer packet and a PPP data packet including the network-layer packet. The switch switches a connection among the first interface, the second interface, the PPP link controller, and the header processor, depending on which one of a PPP data packet and a link control packet is inputted. The link control packet is used for link establishment and disconnection.

10 Claims, 10 Drawing Sheets

FIG.8

| VALUE OF PROTOCOL FIELD | CONTENTS OF PACKET DATA |
|---|---|
| 0021 | IP DATA |
| 8021 | INTERNET PROTOCOL CONTROL PROTOCOL (NETWORK CONTROL PROTOCOL FOR IP) |
| c021 | LCP(LINK CONTROL PROTOCOL) |

POINT-TO-POINT PROTOCOL TERMINATION DEVICE

BACKGROUND OF THE INVENTION

1. Field of the Invention

The present invention relates to an access network system for access to a backbone network such as Internet, and in particular to a Point-to-Point Protocol (PPP) termination device thereof.

2. Description of the Related Art

PPP is a data link protocol that is very popular for data communication between two computer systems. Typically, the PPP protocol is used for computer dial-up access to an Internet Service Provider (ISP) over telephone lines. PPP also provides Authentication, Accounting, Service Management System (SMS), bandwidth allocation for each subscriber, etc.

In the case of Internet access, it is necessary to terminate PPP to transfer IP (Internet Protocol) packets to the Internet. Conventionally, a dedicated device is installed at the gate to the ISP to perform PPP termination.

FIG. 1 shows an example of a conventional access network system. In the access network system, a personal computer (PC) 1 is connected to an ADSL Transceiver Unit-Remote (ATU-R) 2, which is connected to a Digital Subscriber Line Access Multiplexer (DSLAM) 3 through ADSL/VDSL line 1101, wherein ADSL stands for Asymmetric Digital Subscriber Line and VDLS for Very high-speed DSL. The DSLAM 3 is connected to an ATM switch (SW) 4 through ATM OC-3c transmission service 2101. The ATM SW 4 is connected to PPP termination device 5 through ATM OC-12c transmission service 3101. In this example, the PPP termination device 5 is the dedicated device for terminating PPP 501 to transfer IP packets to a backbone network 6 such as Internet. Therefore, the PPP termination device 5 is substantially a gate to the ISP.

A packet communication system based on the PPP protocol has been disclosed in Japanese Patent Application Unexamined Publication No, 10-322399. In this packet communication system, IP packets are converted to PPP packets according to the PPP protocol and then the PPP packets are in turn converted to ATM cells and vice versa. Such an arrangement allows a plurality of ATM logical lines to be multiplexed into a single physical line without loss of PPP functions and ATM additional functions.

However, according to the prior art, as shown in FIG. 1, it is necessary to provide the PPP termination device 5 at the gate of the backbone network 6, where a large number of subscriber's signals are multiplexed. It is also necessary to increase the number of PPP termination devices depending on an increasing number of subscribers.

Alternatively, it can be considered that the ATM layer and the higher AAL5 layer processing and PPP termination are implemented in the DSLAM 3. However, the virtual Channel (VC) itself must be processed at a layer higher than the AAL5 layer, resulting in more complicated structure of the DSLAM 3, increased system cost, and complicated system management.

SUMMARY OF THE INVENTION

An object of the present invention is to provide a PPP termination device in an access network system, allowing PPP termination at a location where a decreased number of subscriber's signals are multiplexed.

Another object of the present invention is to provide a PPP termination device in an access network system, which can flexibly deal with an increase in the number of subscribers.

According to the present invention, the Point-to-Point Protocol (PPP) termination is performed in a switch in the access network system by which a subscriber gets access to a backbone network.

A PPP termination device includes: a first interface to a Digital Subscriber Line Access Multiplexer (DSLAM); a second interface to a backbone network; a Point-to-Point Protocol (PPP) link controller for establishing and disconnecting a PPP link; a header processor for converting between a network-layer packet and a PPP data packet including the network-layer packet; and a switch for switching a connection among the first interface, the second interface, the PPP link controller, and the header processor, depending on which one of a PPP data packet and a link control packet is inputted, wherein the link control packet is used for link establishment and disconnection.

According to an aspect of the present invention, a PPP termination device includes: a first interface for inputting and outputting PPP packets in Asynchronous Transfer Mode (ATM) cells from and to a corresponding Digital Subscriber Line Access Multiplexer (DSLAM); a second interface for inputting and outputting network-layer packets in ATM cells from and to the backbone network; a PPP link controller for establishing and disconnecting a PPP link; a packet processor for converting between a network-layer packet and a PPP data packet including the network-layer packet and controlling cell forwarding; and an ATM switch for switching ATM cells among the first interface, the second interface, the PPP link controller, and the packet processor, depending on which one of a PPP data packet in ATM cells and a link control packet in ATM cells is inputted, wherein the link control packet is used for link establishment and disconnection.

The packet processor may include: a header processor; and a first AAL5-SAR (ATM Adaptation Layer type 5—Segmentation And Reassembly) section, wherein the header processor determines which one of a PPP data packet in ATM cells and a link control packet in ATM cells is inputted from the first interface through the first AAL5-SAR section and, when the PPP data packet has been inputted through the first AAL5-SAR section, generates a network-layer packet by removing a PPP header of the PPP data packet, and the first AAL5-SAR section segments the network-layer packet into ATM cells to be forwarded to the second interface by the ATM switch.

When the link control packet has been inputted from the first interface through the first AAL5-SAR section, the first AAL5-SAR section segments the link control packet into ATM cells to be forwarded to the PPP link controller by the ATM switch, wherein the PPP link controller performs a link establishment procedure based on the link control packet in ATM cells.

When receiving a network-layer packet in ATM cells from the backbone network, the packet processor performs PPP encapsulation to generate a PPP data packet from the network-layer packet and the first AAL5-SAR section segments the PPP data packet into ATM cells to be forwarded to the first interface by the ATM switch.

The PPP link controller may include: a second AAL5-SAR section; and a processor, wherein, when receiving the link control packet from the first interface through the second AAL5-SAR section, the processor generates a response control packet in response to the link control packet and the second AAL5-SAR section segments the response control packet into ATM cells to be forwarded to the first interface by the ATM switch.

According to another aspect of the present invention, a Point-to-Point Protocol (PPP) termination device in an access network system by which a subscriber gets access to a backbone network, include: a first interface for inputting and outputting PPP packets over SONET (Synchronous Optical NETwork) from and to a corresponding Digital Subscriber Line Access Multiplexer (DSLAM), wherein the first interface includes a first packet processor for determining which one of a PPP data packet and a link control packet is inputted, converting between a packet and ATM cells, and controlling cell forwarding; a second interface for inputting and outputting network-layer packets over SONET from and to the backbone network, wherein the second interface includes a second packet processor for converting between a network-layer packet and a PPP data packet including the network-layer packet, converting between a packet and ATM cells, and controlling cell forwarding; a PPP link controller for establishing and disconnecting a PPP link; and an ATM switch for switching ATM cells among the first interface, the second interface, and the PPP link controller, depending on which one of a PPP data packet and a link control packet is inputted.

The first packet processor may include: a first header processor; and a first AAL5-SAR (ATM Adaptation Layer type 5—Segmentation And Reassembly) section, wherein the first header processor determines which one of a PPP data packet and a link control packet is inputted from the first interface and, when the PPP data packet has been inputted, generates a network-layer packet by removing a PPP header of the PPP data packet, and the first AAL5-SAR section segments the network-layer packet into ATM cells to be forwarded to the second interface by the ATM switch.

When the link control packet has been inputted from the first interface, the first AAL5-SAR section segments the link control packet into ATM cells to be forwarded to the PPP link controller by the ATM switch, wherein the PPP link controller performs a link establishment procedure based on the link control packet.

The second packet processor may include: a second header processor; and a second AAL5-SAR section, wherein, when receiving a network-layer packet over SONET from the backbone network, the second header processor performs PPP encapsulation to Generate a PPP data packet from the network-layer packet and the second AAL5-SAR section segments the PPP data packet into ATM cells to be forwarded to the first interface by the ATM switch.

The PPP link controller may include: a third AAL5-SAR section; and a processor, wherein, when receiving the link control packet from the first interface through the third AAL5-SAR section, the processor generates a response control packet in response to the link control packet and the third AAL5-SAR section segments the response control packet into ATM cells to be forwarded to the first interface by the ATM switch.

An access network system according to an embodiment of the present invention, includes: a plurality of subscriber computers; a plurality of Remote ADSL Transceiver Units (ATU-Rs) each connected to the subscriber computers; a plurality of Digital Subscriber Line Access Multiplexers (DSLAMs), each of which accommodates a plurality of ATU-Rs; an access gateway to a backbone network, the access gateway accommodating a plurality of DSLAMs, wherein the access gateway comprises:

a first interface to a corresponding Digital Subscriber Line Access Multiplexer (DSLAM);

a second interface to the backbone network;

a Point-to-Point Protocol (PPP) link controller for establishing and disconnecting a PPP link with an ATU-R;

a header processor for converting between a network-layer packet and a PPP data packet including the network-layer packet and; and a switch for switching a connection among the first interface, the second interface, the PPP link controller, and the header processor, depending on which one of a PPP data packet and a link control packet is inputted, wherein the link control packet is used for link establishment and disconnection.

As described above, according to the present invention, a PPP termination device allows PPP termination at a location where a decreased number of subscriber's signals are multiplexed. This may prevent the network from confusion due to unauthorized accesses. In addition, the PPP termination device can flexibly deal with an increase in the number of subscribers.

BRIEF DESCRIPTION OF THE DRAWINGS

FIG. 8 is a diagram showing the values of protocol field of a PPP packet and a corresponding content of the packet data;

DESCRIPTION OF THE PREFERRED EMBODIMENTS

First Embodiment

Figure 1:
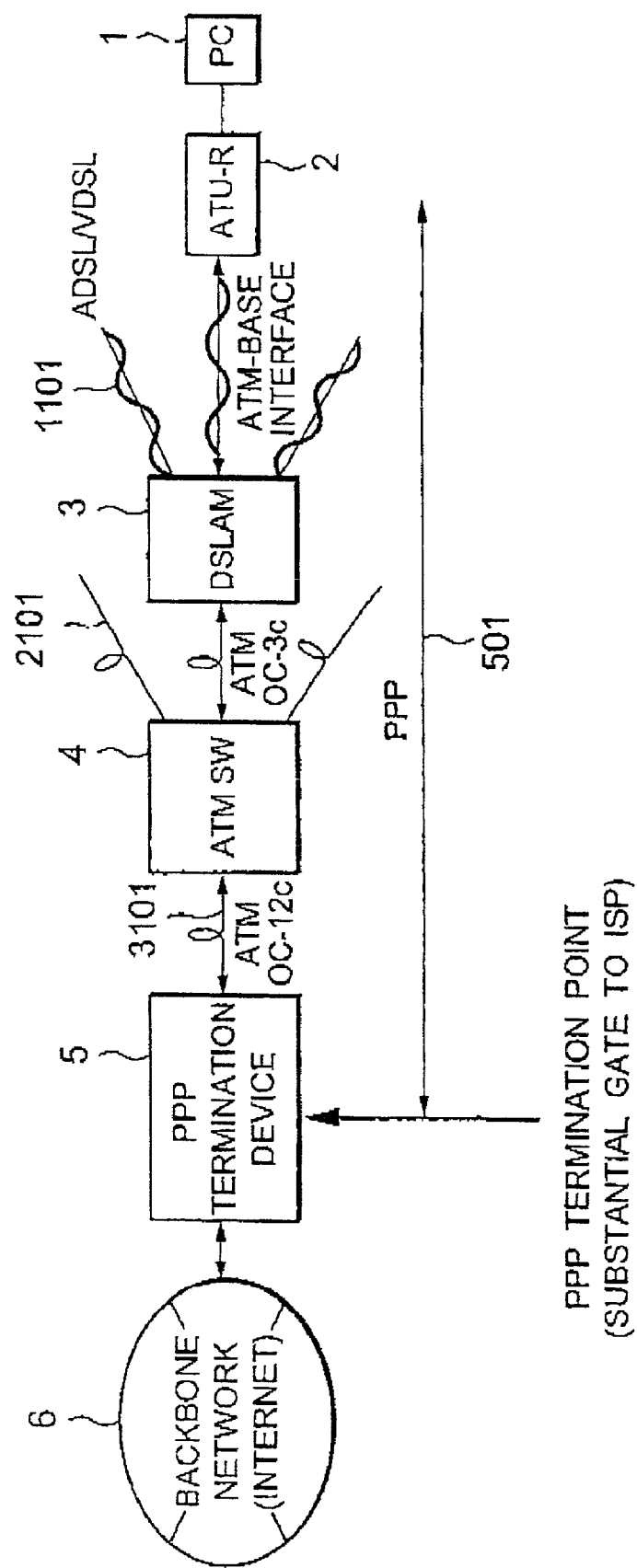
FIG. 1 is a block diagram showing an example of a conventional access network system.
Figure 2:
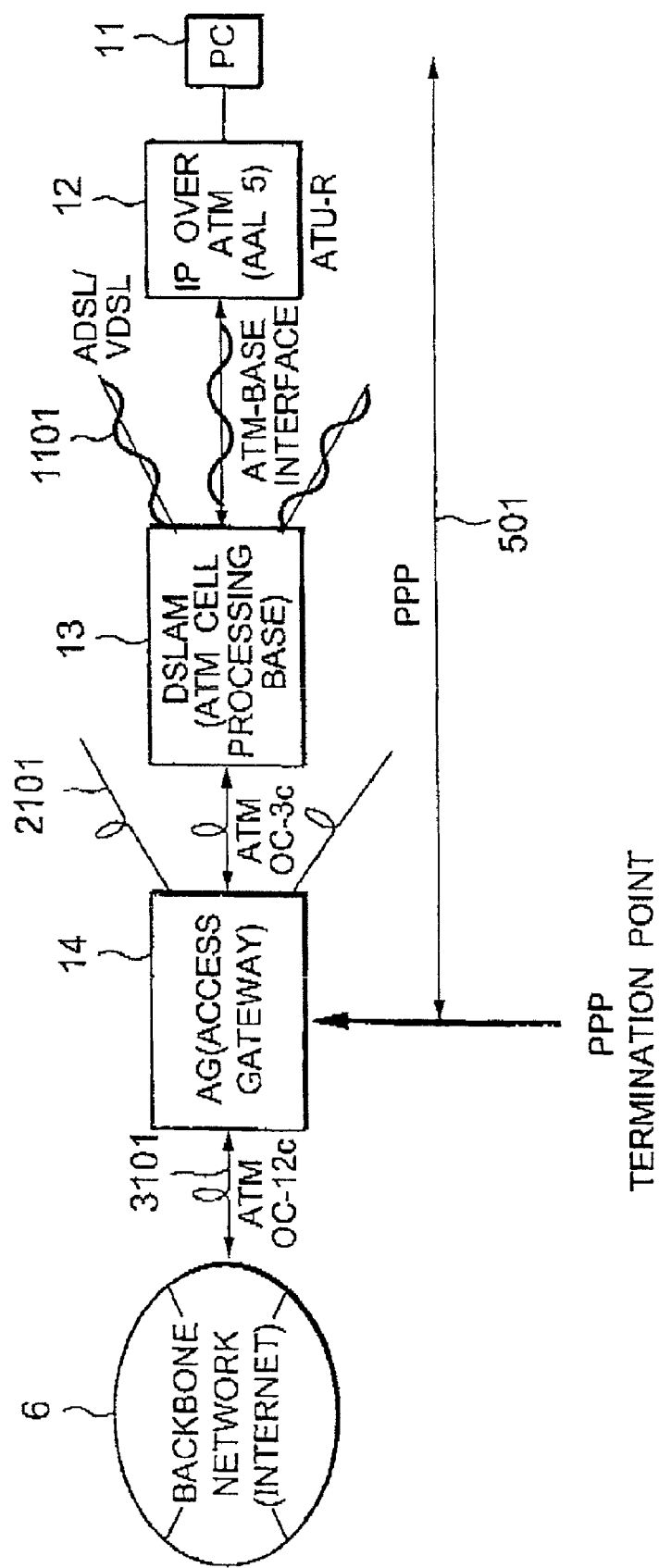
FIG. 2 is a block diagram showing the configuration of an access network system according to a first embodiment of the present invention.

Referring to FIG. 2, it is assumed for simplicity that an access network system according to a first embodiment of the present invention includes a subscriber's personal computer (PC) 11 connected to an ADSL Transceiver Unit-Remote (ATU-R) 12, which is connected to a Digital Subscriber Line Access Multiplexer (DSLAM) 13 through ADSL/VDSL line 1101 on a metallic cable. The DSLAM 13 is connected to an access gateway 14 through ATM OC-3c (155 Mbps) transmission service 2101. The access gateway 14 is connected to the backbone network 6 through ATM OC-12c (622 Mbps) transmission service 3101.

The ATU-R 12 has the ATM Adaptation Layer type 5 (AAL5) function and an IP-over-ATM protocol. The DSLAM 13 accommodates a plurality of ATU-Rs 12 to multiplex respective, ATM cell flows into an ATM OC-3c signal and demultiplex an ATM OC-3c signal into respective ATM cell flows. The access gateway 14 accommodates a plurality of DSLAMs 13 and, as will be described later, plays a role as a PPP termination point, or a gate to the ISP, to perform controls including Authentication, Accounting and the like.

PPP Termination

The PPP termination will be described briefly with reference to FIGS. 7–10.

It is necessary to establish a link between the ATU-R 12 and the access gateway 14 according to the PPP protocol before IP packets are transferred in ATM cell form between them.

Figure 7A:
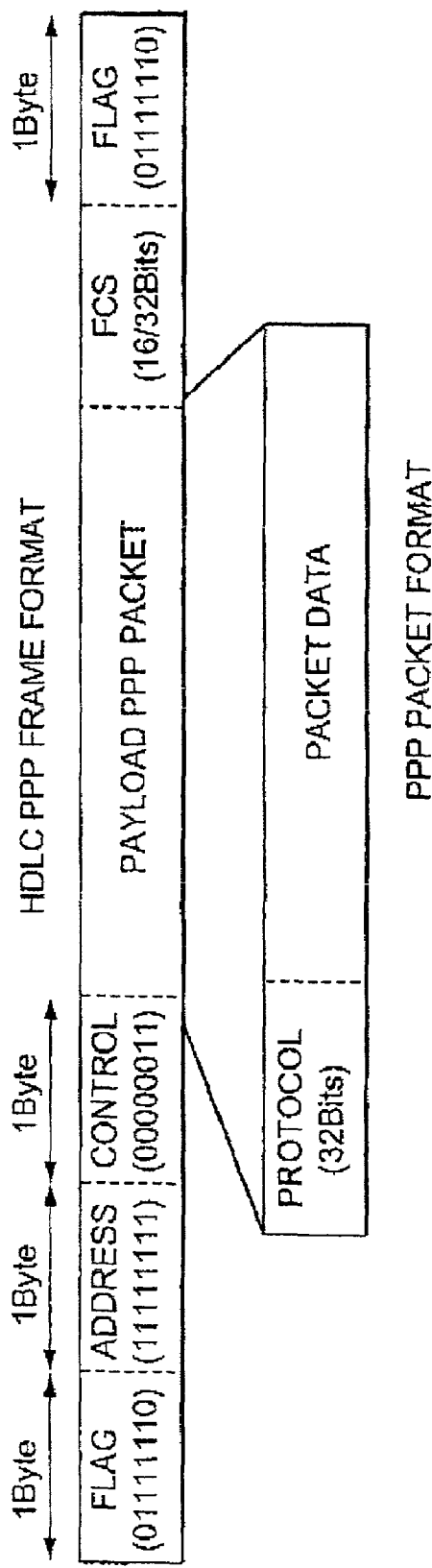
FIG. 7A is a diagram showing a HDLC PPP frame format.

A HDLC (high-level Data Link Control) PPP frame format is shown in FIG. 7A. The HDLC PPP frame is composed of a 1-byte flag field, a 1-byte address field, a 1-byte control field, a payload, a 16/32-bit FCS field, and a 1-byte flag field. A PPP packet is composed of a 32-bit protocol field and a packet data field and is inserted into the payload of the HDLC PPP frame. A network-layer packet such as IP packet or ICMP (Internet Control Message Protocol) packet is inserted into the packet data field. Typically, the network-layer packet is an IP packet.

Figure 7B:
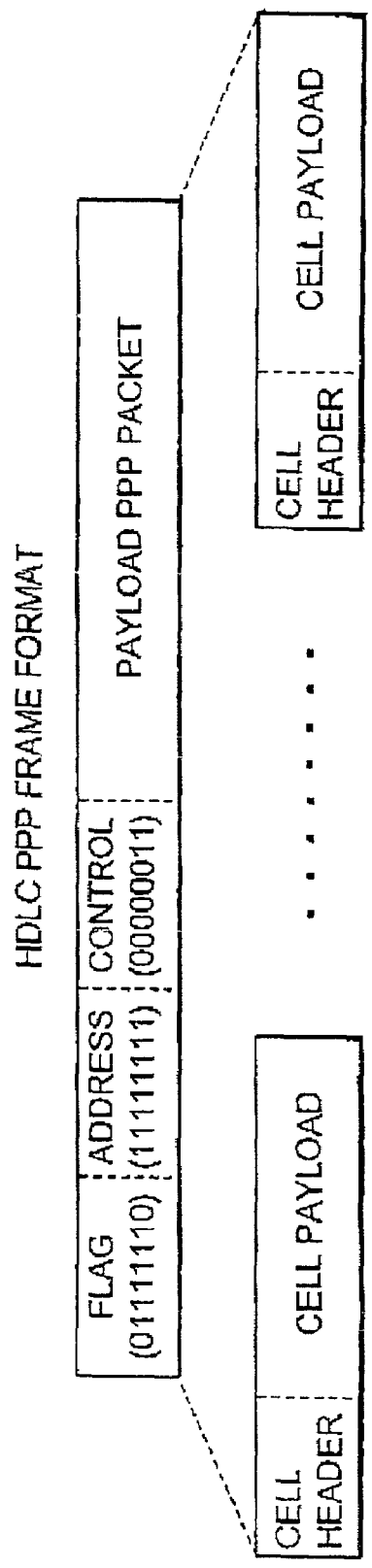
FIG. 7B is a diagram showing ATM cell segmentation of a PPP frame based on AAL5.

As shown in FIG. 7B, the HDLC PPP frame obtained by PPP encapsulation is converted into a plurality of ATM cells each composed of a header and a payload according to the AAL5 function. The ATU-R 12 performs such ATM cell conversion based on the IP-over-ATM protocol.

As shown in FIG. 8, the content of the packet data in the PPP packet of FIG. 7A is determined depending on the value of the protocol field. When '0021' is stored in the protocol field, the PPP packet is a PPP data packet storing IP data in the packet data field. When '8021' or 'c021' is stored in the protocol field, the PPP packet is a link control packet or a LCP packet.

Figure 9:
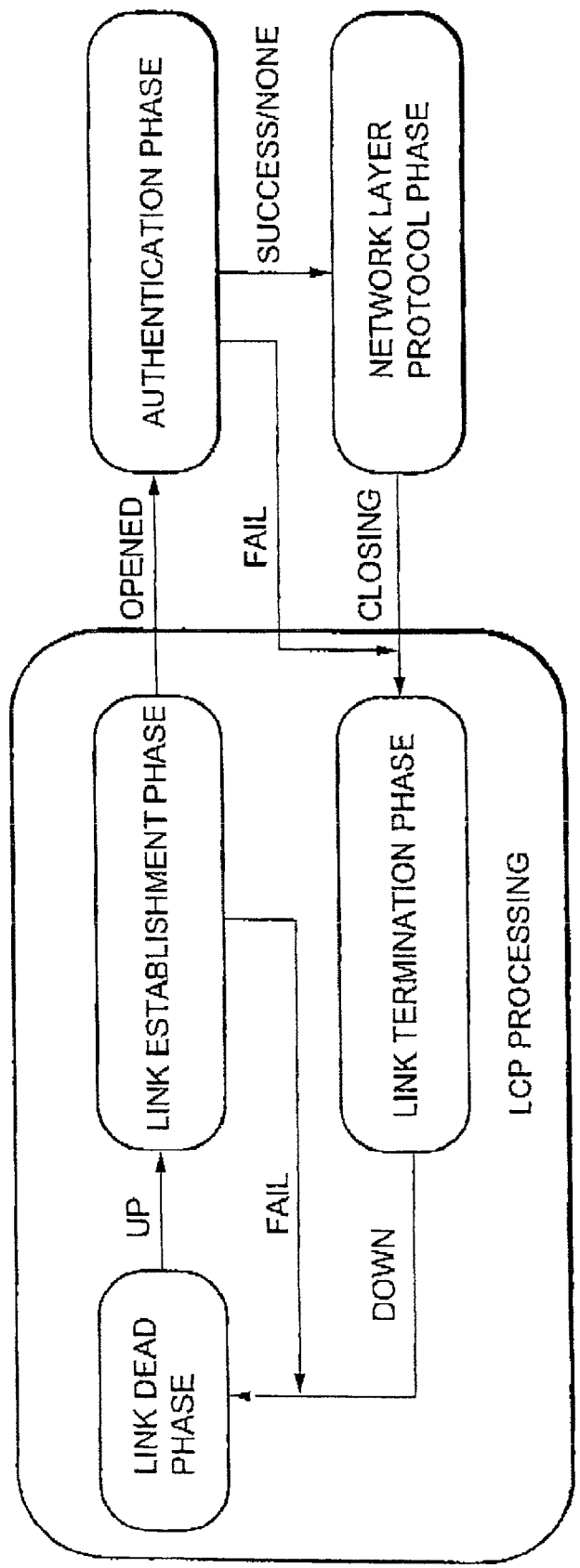
FIG. 9 is a diagram showing PPP link processing.

As shown in FIG. 9, in Link Control Protocol (LCP) processing, after a link has been established (Link Establishment Phase), Authentication is performed (Authentication Phase). When the authentication has been successfully completed, a Network Layer Protocol Phase is started. When closing, a Link Termination Phase is started in the LCP processing.

Figure 10:
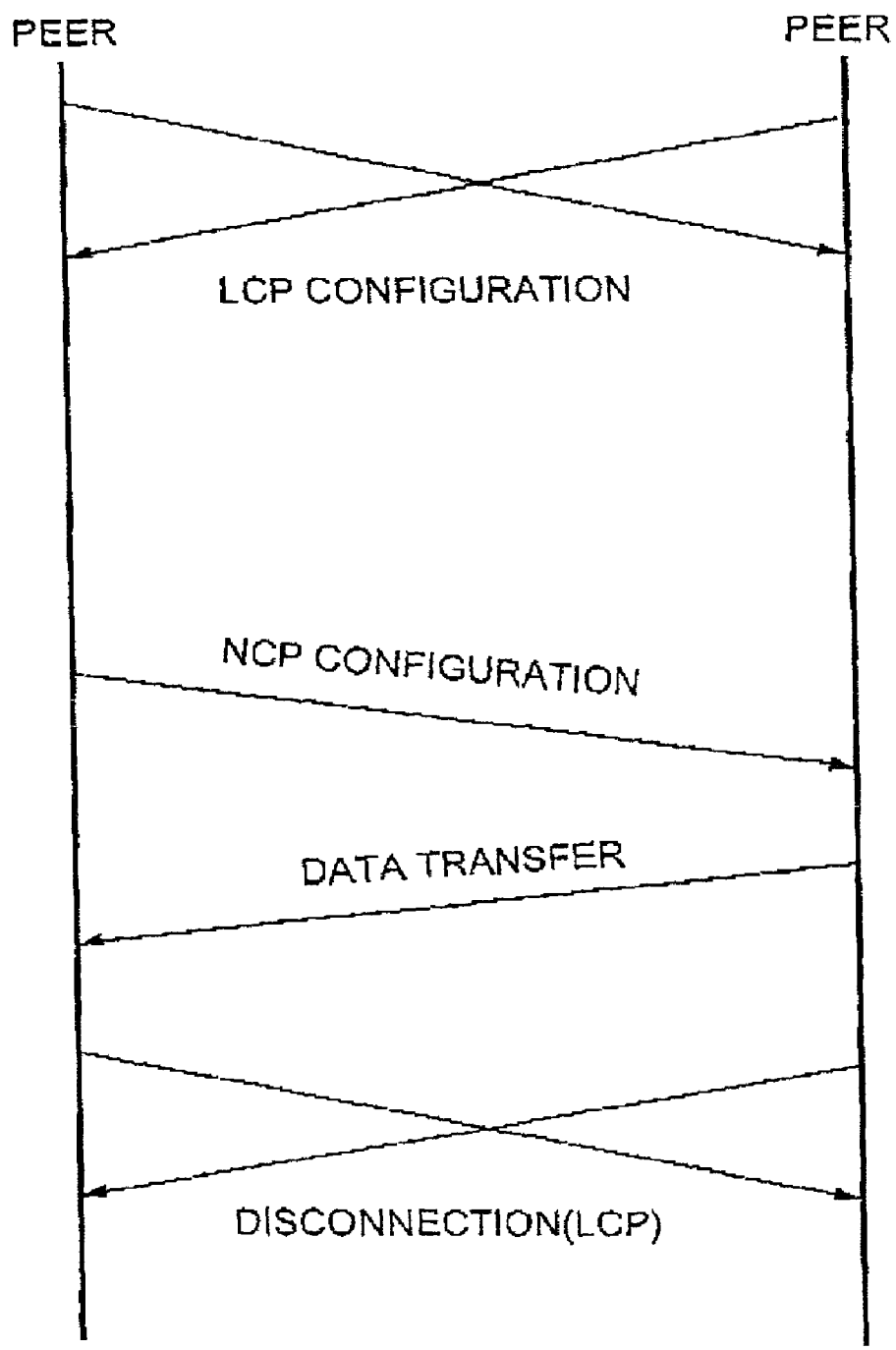
FIG. 10 is a diagram showing PPP processing sequence.

In summary, as shown in FIG. 10, on a peer-to-peer line, a LCP packet having 'c021' stored in the protocol field is used to establish the link (LCP Configuration). Thereafter, a NCP packet having '8021' stored in the protocol field is used to perform configuration for upper layer data transfer (NCP Configuration). Then, user packets (IP packets) are transferred (Data Transfer).

Since the PPP frame as shown in FIG. 7B is transmitted in the form of ATM cells using AAL5, the PPP termination cannot be performed without AAL5-SAR (Segmentation And Reassembly) processing. The SAR function is used to reassemble an original PPP frame, which allows the link establishment processing.

According to the present embodiment, the PPP termination is performed in the access gateway 14. The details will be described hereinafter.

Access Gateway 1.1) Structure

Figure 3:
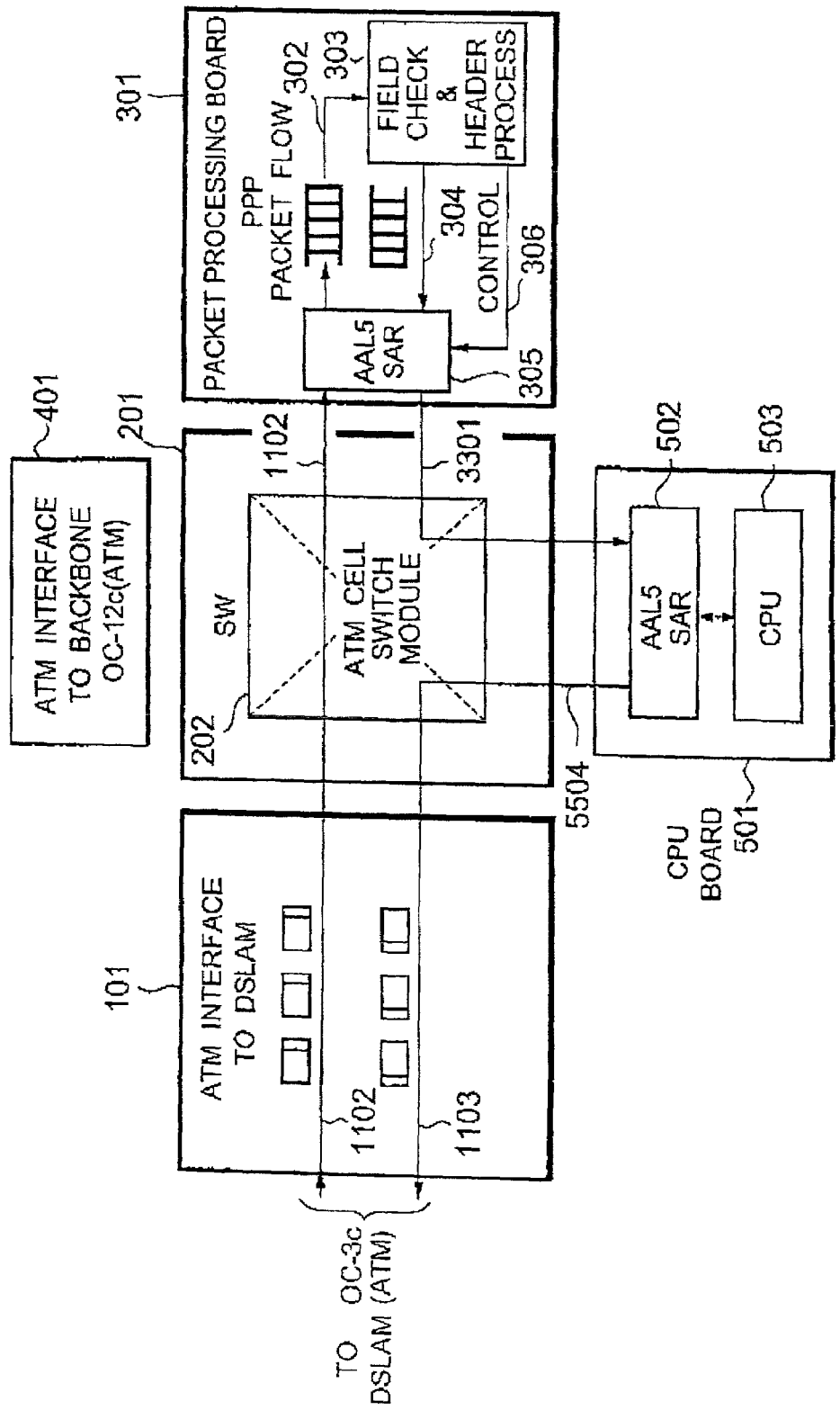
FIG. 3 is a block diagram showing an access gateway of the first embodiment so as to explain a termination operation of PPP control packet.

As shown in FIG. 3, the access gateway 14 is composed of a DSLAM-side ATM interface board 101, a switch board 201, a packet processing board 301, a backbone-side ATM interface board 401, and a CPU board 501.

The ATM interface board 101 receives and transmits optical ATM cells from and to the DSLAM 13 at OC-3c transmission speed. A received ATM cell flow 1102 is converted from optical to electrical, and is transferred to the switch board 201. A transmitted ATM cell flow 1103 is converted from electrical to optical, and is transmitted to the DSLAM 13.

Figure 4:
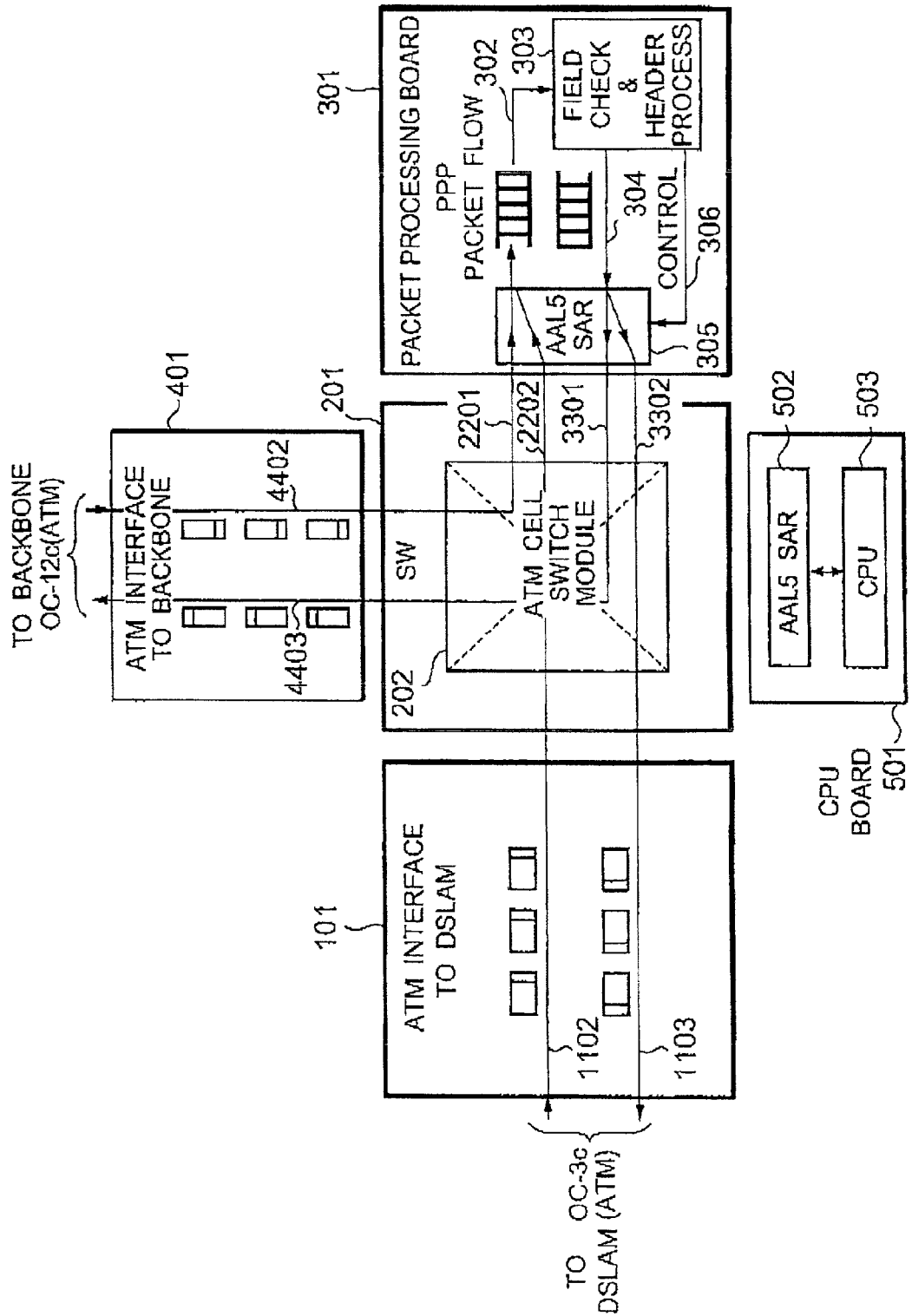
FIG. 4 is a block diagram showing the access gateway of the first embodiment so as to explain a termination operation of PPP data packet.

The ATM interface board 401 receives and transmits optical ATM cells from and to the backbone network 6 at OC-12c transmission speed. As shown in FIG. 4, a received ATM cell flow 4402 is converted from optical to electrical, and is transferred to the switch board 201. An ATM cell flow 4403 received from the switch board 201 is converted from electrical to optical, and is transmitted to the backbone network 6.

The switch board 201 has an ATM switch module 202 implemented thereon. The ATM switch module 202 forwards an ATM cell received from one input port to an appropriate output port depending on the routing information VPI/VCI of the ATM cell.

In this embodiment, the ATM switch module 202 has a throughput of the order of 5 Gbps.

The packet processing board 301 has a field check and header process section 303 and an AAL5-SAR section 305 implemented thereon. The AAL5-SAR section 305 reassembles a flow of ATM cells received from the ATM switch module 202 to output an original packet flow 302 to the field check and header process section 303. The AAL5-SAR section 305 also segments a packet flow 304 received from the field check and header process section 303 to produce a flow of ATM cells under control of the field check and header process section 303. The AAL5-SAR section 305 has a capability to process an OC-12c flow of ATM cells received from the backbone network. The number of ATM connections the AAL5-SAR section 305 is capable of concurrently processing is several tens thousands.

The CPU board 501 has an AAL5-SAR section 502 and a central processing unit (CPU) 503 implemented thereon, which terminates the PPP protocol with reference to FIG. 3.

1.2) Link Control

As shown in FIG. 3, an ATM cell flow 1102 received from the DSLAM 13 at the ATM interface board 101 is forwarded to the packet processing board 301 through the ATM switch module 202. The AAL5-SAR section 305 reassembles the received ATM cells into an original PPP packet.

When receiving a PPP packet from the AAL5-SAR section 305, the field check and header process section 303 looks at the protocol field of the PPP packet (see FIG. 7A). If the value of the protocol field is '8021' or 'C021', then the field check and header process section 303 outputs a control signal 306 indicating that the received PPP packet is a link control packet (see FIG. 8) and forwards the link control packet 304 to the AAL5-SAR section 305. Tho AAL5-SAR section 305 segments it into ATM cells each having VPI/VCI added to the header thereof so as to be forwarded to the CPU board 501 by the ATM switch module 202. Accordingly, the ATM switch module 202 switches a flow of ATM cells 3301 to the CPU board 501.

The AAL5-SAR section 502 of the CPU board 501 reassembles the received ATM cells from the ATM switch module 202 to produce an original PPP packet (link control packet) and outputs it to the CPU 503. The CPU 503 executes a PPP processing program to perform the PPP processing as shown in FIGS. 9 and 10. In the PPP processing, as described before, the CPU 503 generates a response packet from the link control packet and the AAL5-SAR section 502 segments it into a flow of ATM cells 5504, each cell having VPI/VCI directed to the subscriber PC originating the flow of ATM cells 1102 through the ATM interface board 101 by the ATM switch module 202. Accordingly, the ATM switch module 202 switches the flow of ATM cells 5504 to the ATM interface board 101, from which the flow of ATM cells 5504 is transmitted as an optical OC-3c ATM signal to the DSLAM 13. The DSLAM 13 demultiplexes it into a plurality of flows of ATM cells for respective ADSL/VDSL lines depending on the VPI/VCI information of each ATM cell, each or which is forwarded to a corresponding ATU-R 12. In this manner, the link between the ATU-R 12 and the access gateway 14 is established.

1.3) Data Transfer

As shown in FIG. 4, an ATM cell flow 1102 received from the DSLAM 13 at the ATM interface board 101 is forwarded to the packet processing board 301 through the ATM switch module 202. The AAL5-SAR section 305 reassembles the received ATM cells into an original PPP packet.

When receiving a PPP packet from tho AAL5-SAR section 305, the field check and header process section 303 looks at the protocol field of the PPP packet (see FIG. 7A). If the value of the protocol field is '0021', then the field check and header process section 303 outputs a control signal 306 indicating that the received PPP packet is a PPP data packet including an IP packet (see FIG. 8) and terminates the PPP protocol to forward the IP packet 304 included in the PPP data packet 302 to the AAL5-SAR section 305.

The AAL5-SAR section 305 segments the IP packet 304 to produce a flow of ATM cells 3301, each cell having VPI/VCI added to the header thereof so as to be forwarded to the backbone-side ATM interface board 401 by the ATM switch module 202. Accordingly, the ATM switch module 202 switches the flow of ATM cells 3301 and then outputs it as an ATM cell flow 4403 to the ATM interface board 401. The ATM interface board 401 converts the ATM cell flow 4403 from electrical to optical to transmit it as an OC-12c optical ATM cell flow to the backbone network 6.

In the case where an ATM cell flow 4402 received from the backbone network 6 at the ATM interface board 401 is forwarded to the packet processing board 301 through the ATM switch module 202. The AAL5-SAR section 305 reassembles the received ATM cells into an original IP packet.

When receiving the IP packet from the AAL5-SAR section 305, the field check and header process section 303 performs PPP encapsulation to produce a PPP data packet 304 having '0021' stored in the protocol field of the PPP packet (see FIG. 7A and FIG. 8). The field check and header process section 303 outputs a control signal 306 indicating that the PPP packet is a PPP data packet including an IP packet (see FIG. 8) and forwards the PPP data packet 304 to the AAL5-SAR section 305.

The AAL5-SAR section 305 segments the PPP data packet 304 to produce a flow of ATM cells 3302, each cell having VPI/VCI added to the header thereof so as to be forwarded to the DSLAM-side ATM interface board 101 by the ATM switch module 202. Accordingly, the ATM switch module 202 switches the flow of ATM cells 3302 and then outputs it as an ATM cell flow 1103 to the ATM interface board 101. The ATM interface board 401 converts the ATM cell flow 1103 from electrical to optical to transmit it as an OC-3c optical ATM cell flow to the DSLAM 13.

The DSLAM 13 demultiplexes it into a plurality of flows of ATM cells for respective ADSL/VDSL lines depending on the VPI/VCI information of each ATM cell, each of which is forwarded to a corresponding ATU-R 12. The ATU-R 12 reassembles the received ATM cells into a PPP packet and terminates the PPP protocol to output the IP packet included in the PPP packet to the subscriber PC 11.

Second Embodiment

Figure 5:
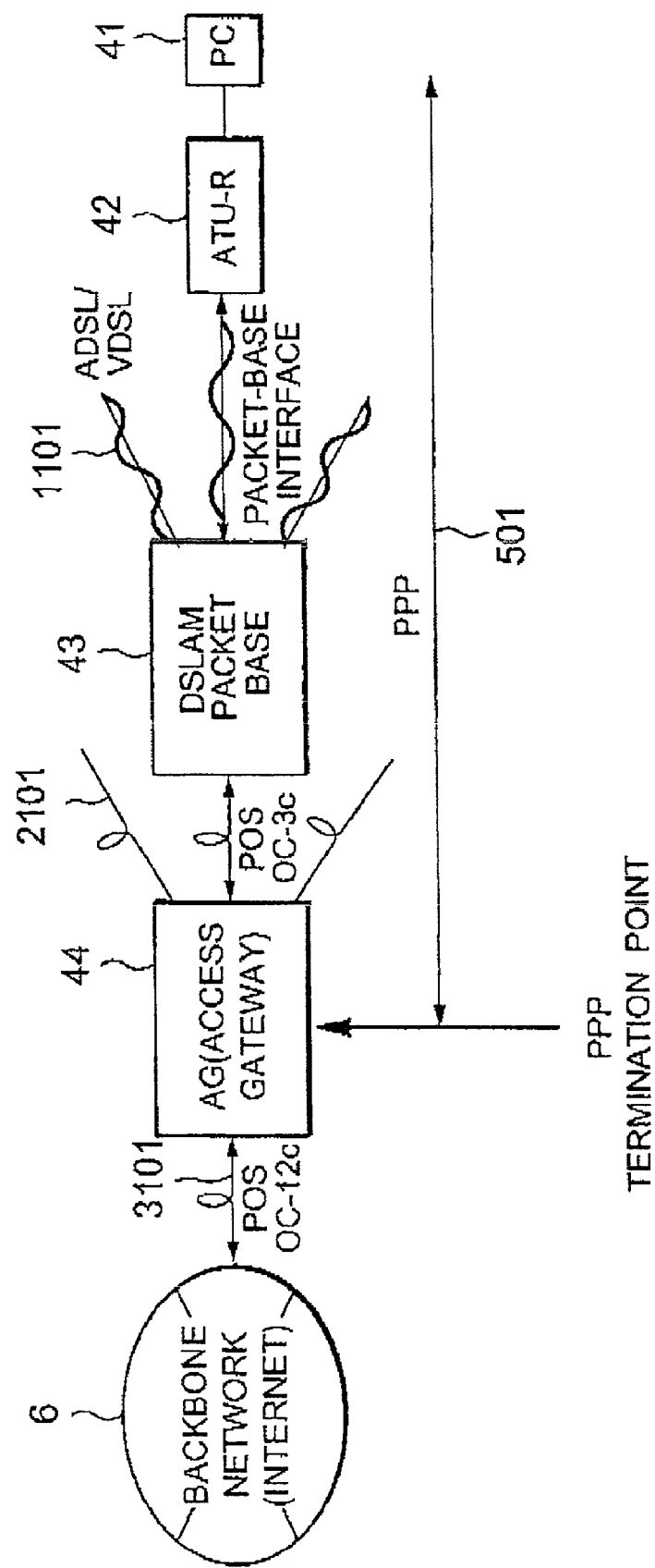
FIG. 5 is a block diagram showing the configuration of an access network system according to a second embodiment of the present invention.

Referring to FIG. 5, it is assumed for simplicity that an access network system according to a second embodiment of the present invention includes a subscriber's personal computer (PC) 41 connected to an ADSL Transceiver Unit-Remote (ATU-R) 42, which is connected to a Digital Subscriber Line Access Multiplexer (DSLAM) 43 through ADSL/VDSL line 1101 on a metallic cable. In this embodiment, the ATU-R 42 is connected to the DSLAM 43 by packet-base interface. The DSLAM 43 is connected to an access gateway 44 through Packet-Over-SONET (POS) OC-3c transmission service 2101. The DSLAM 43 multiplexes a plurality of packet flows received from ATU-Rs 12 to produce a 155 Mbps POS frame signal (OC-3c), which is transmitted to the access gateway 44. The DSLAM 43 also demultiplexes a POS OC-3c frame signal received from the access gateway 44 into respective packet flows. The access gateway 44 is connected to a POS-ready backbone network 6 through POS OC-12c transmission service 3101.

Access Gateway 2.1) Structure

Figure 6:
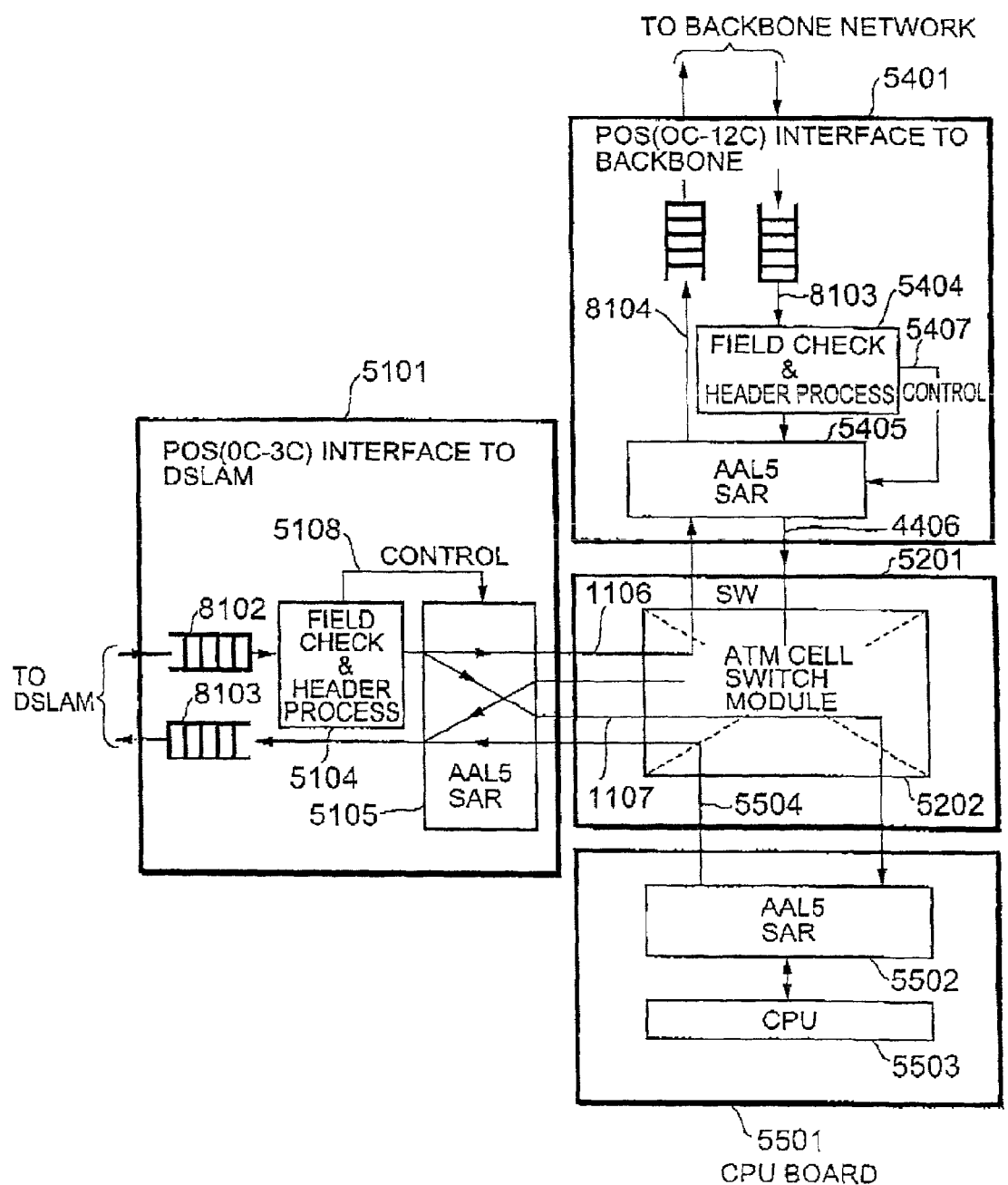
FIG. 6 is a block diagram showing an access gateway of the second embodiment so as to explain a PPP termination operation.

As shown in FIG. 6, the access gateway 44 is composed of a DSLAM-side POS (OC-3c) interface board 5101, a switch board 5201, a backbone-side POS (OC-12c) interface board 5401, and a CPU board 5501.

In the second embodiment, the DSLAM-side POS (OC-3c) interface board 5101 has a field check and header process section 5104 and an AAL5-SAR section 5105 implemented thereon. The backbone-side POS (OC-12c) interface board 5401 has a field check and header process section 5404 and an AAL5-SAR section 5405 implemented thereon. The switch hoard 5201 has an ATM switch module 5202 implemented thereon. The CPU board 5501 has an AAL5-SAR section 5502 and a CPU 5503 implemented thereon, which terminates the PPP protocol as described before.

2.2) Link Control

Referring to FIG. 6, a PPP packet flow 8102 is received from the DSLAM 43 at the POS interface board 5101. When receiving the PPP packet flow 8102, the field check and header process section 5104 looks at the protocol field of a PPP packet (see FIG. 7A). If the value of the protocol field is '8021' or 'c021', then the field check and header process section 5104 outputs a control signal 5108 indicating that the received PPP packet is a link control packet (see FIG. 8) and forwards the link control packet to the AAL5-SAR section 5105. The AAL5-SAR section 5105 segments it into ATM cells each having VPI/VCI added to the header thereof so as to be forwarded to the CPU board 5501 by the ATM switch module 5202. Accordingly, the ATM switch module 5202 switches a flow of ATM cells 1107 to the CPU board 5501.

The AAL5-SAR section 5502 of the CPU board 5501 reassembles the received ATM cell flow 1107 from the ATM switch module 5202 to produce an original PPP packet (link control packet) and outputs it to the CPU 5503. The CPU 503 executes a PPP processing program to perform the PPP processing as shown in FIGS. 9 and 10. In the PPP processing, as described before, the CPU 5503 generates a response packet from the link control packet and the AAL5-SAR section 5502 segments it into a flow of ATM cells 5504, each cell having VPI/VCI directed to the subscriber PC originating the flow of ATM cells 1107 through the POS interface board 5101 by the ATM switch module 5202. Accordingly, the ATM switch module 5202 switches the flow of ATM cells 5504 to the POS interface board 5101.

When receiving the ATM cell flow 5504 from the ATM switch module 5202, the AAL5-SAR section 5105 reassembles it into a response PPP packet 8103, which is transmitted as an optical OC-3c POS frame signal to the DSLAM 43. The DSLAM 43 demultiplexes it into a plurality of packet flows for respective ADSL/VDSL lines depending on the IP address of each PPP packet, each of which is forwarded to a corresponding ATU-R 42. In this manner, the link between the ATU-R 42 and the access gateway 44 is established.

2.3) Data Transfer

Referring to FIG. 6, a PPP packet flow 810 is received from the DSLAM 43 at the POS interface board 5101. When receiving the PPP packet flow 8102, the field check and header process section 5104 looks at the protocol field of a PPP packet (see FIG. 7A). If the value of the protocol field is '0021', then the field check and header process section 5104 outputs a control signal 5108 indicating that the received PPP packet is a PPP data packet including an IP packet (see FIG. 8) and terminates the PPP protocol to forward the IP packet included in the PPP data packet to the ALL5-SAR section 5105.

The AAL5-SAR section 5105 segments the IP packet to produce a flow of ATM cells 1106, each cell having VPI/VCT added to the header thereof so as to be forwarded to the backbone-side POS interface board 5401 by the ATM switch module 5202. Accordingly, the ATM switch module 5202 switches the flow of ATM cells 1106 and then outputs it to the POS interface board 5401. When receiving the ATM sell flow 1106 from the ATM switch module 5202, the AAL5-SAR section 5405 of the POS interface board 5401 reassembles it into an original IP packet 8104, which is transmitted as an optical OC-12c POS frame signal to the backbone network 6.

In the case where a POS OC-12c signal is received from the backbone network 6 at the POS interface board 5401, an IP packet 8103 is output to the field check and header process section 5404. The field check and header process section 5404 adds the protocol field to the received IP packet (see FIG. 7A) to produce a PPP data Packet (PPP encapsulation). The PPP data packet is output to the AAL5-SAR section 5405. The AAL5-SAR section 5405 segments the PPP data packet including the received IP packet into ATM cells each having VPI/VCI added to the header thereof so as to be forwarded to the DSLAM-side POS interface board 5101 by the ATM switch module 5202.

When receiving an ATM cell flow 4406 from the ATM switch module 5202, the AAL5-SAR section 5105 of the POS interface board 5101 reassembles it into an original PPP data packet 8103, which is transmitted as an optical OC-3c POS frame signal to the DSLAM 43.

The DSLAM 43 demultiplexes the optical OC-3c POS frame signal into a plurality of flows of PPP packets for respective ADSL/VDSL lines depending on the IP address of each PPP packet, each of which is forwarded to a corresponding ATU-R 12. The ATU-R 12 terminates the PPP protocol to output the IP packet included in the PPP packet to the subscriber PC 11.

The invention claimed is:

1. A Point-to-Point Protocol (PPP) termination device in an access network system by which a subscriber gets access to a backbone network, comprising:

a first interface to a Digital Subscriber Line Access Multiplexer (DSLAM);

a second interface to a backbone network;

a Point-to-Point Protocol (PPP) link controller for establishing and disconnecting a PPP link;

a header processor for converting between a network-layer packet and a PPP data packet including the network-layer packet;

a switch for switching a connection among the first interface, the second interface, the PPP link controller, and the header processor, depending on which one of a PPP data packet and a link control packet is inputted, wherein the link control packet is used for link establishment and disconnection; and a segmentation and reassembly section, wherein the header processor is arranged and adapted to determine which one of a PPP data packet and a link control packet is inputted from the first interface and, when the link control packet has been inputted, the segmentation and reassembly section segments the link control packet into cells to be forwarded to the PPP link controller by the switch, wherein the PPP link controller performs a link establishment procedure based on the link control packet in the cells.

2. The PPP termination device of claim 1, wherein the header processor is further arranged and adapted so that when the PPP data packet has been inputted, the segmentation and reassembly section generates a network-layer packet by removing a PPP header from the PPP data packet and segments the network-layer packet into cells to be forwarded to the second interface by the switch.

3. A Point-to-Point Protocol (PPP) termination device in an access network system by which a subscriber gets access to a backbone network, comprising:

a first interface for inputting and outputting PPP packets in Asynchronous Transfer Mode (ATM) cells from and to a corresponding Digital Subscriber Line Access Multiplexer (DSLAM);

a second interface for inputting and outputting network-layer packets in ATM cells from and to the backbone network;

a PPP link controller for establishing and disconnecting a PPP link;

a packet processor for converting between a network-layer packet and a PPP data packet including the network-layer packet and controlling cell forwarding; and an ATM switch for switching ATM cells among the first interface, the second interface, the PPP link controller, and the packet processor, depending on which one of a PPP data packet in ATM cells and a link control packet in ATM cells is inputted, wherein the link control packet is used for link establishment and disconnection, wherein the packet processor comprises a header processor, and a first AAL5-SAR (ATM Adaptation Layer type 5—Segmentation And Reassembly) section, wherein the header processor determines which one of a PPP data packet in ATM cells and a link control packet in ATM cells is inputted from the first interface through the first AAL5-SAR section and, when the PPP data packet has been inputted through the first AAL5-SAR section, generates a network-layer packet by removing a PPP header of the PPP data packet, and the first AAL5-SAR section segments the network-layer packet into ATM cells to be forwarded to the second interface by the ATM switch, and wherein, when the link control packet has been inputted from the first interface through the first AAL5-SAR section, the first AAL5-SAR section segments the link control packet into ATM cells to be forwarded to the PPP link controller by the ATM switch, wherein the PPP link controller performs a link establishment procedure based on the link control packet in ATM cells.

4. The PPP termination device according to claim 3, wherein, when receiving a network-layer packet in ATM cells from the backbone network, the packet processor performs PPP encapsulation to generate a PPP data packet from the network-layer packet and the first AAL5-SAR section segments the PPP data packet into ATM cells to be forwarded to the first interface by the ATM switch.

5. The PPP termination device according to claim 3, wherein the PPP link controller comprises:
a second AAL5-SAR section; and
a processor,
wherein, when receiving the link control packet from the first interface through the second AAL5-SAR section, the processor generates a response control packet in response to the link control packet and the second AAL5-SAR section segments the response control packet into ATM cells to be forwarded to the first interface by the ATM switch.

6. A Point-to-Point Protocol (PPP) termination device in an access network system by which a subscriber gets access to a backbone network, comprising:
a first interface for inputting and outputting PPP packets over SONET (Synchronous Optical NETwork) from and to a corresponding Digital Subscriber Line Access Multiplexer (DSLAN), wherein the first interface includes a first packet processor for determining which one of a PPP data packet and a link control packet is inputted, converting between a packet and ATM cells, and controlling cell forwarding;
a second interface for inputting and outputting network-layer packets over SONET from and to the backbone network, wherein the second interface includes a second packet processor for converting between a network-layer packet and a PPP data packet including the network-layer packet, converting between the PPP data packet and ATM cells, and controlling cell forwarding;
a PPP link controller for establishing and disconnecting a PPP link; and
an ATM switch for switching ATM cells among the first interface, the second interface, and the PPP link controller, depending on which one of a PPP data packet and a link control packet is inputted,
wherein the first packet processor comprises a first header processor, and a first AAL5-SAR (ATM Adaptation Layer type 5—Segmentation And Reassembly) section,
wherein the first header processor determines which one of a PPP data packet and a link control packet is inputted from the first interface and, when the PPP data packet has been inputted, generates a network-layer packet by removing a PPP header of the PPP data packet, and the first AAL5-SAR section segments the network-layer packet into ATM cells to be forwarded to the second interface by the ATM switch, and
wherein, when the link control packet has been inputted from the first interface, the first AAL5-SAR section segments the link control packet into ATM cells to be forwarded to the PPP link controller by the ATM switch, wherein the PPP link controller performs a link establishment procedure based on the link control packet.

7. The PPP termination device according to claim 6, wherein the second packet processor comprises:
a second header processor; and
a second AAL5-SAR section,
wherein, when receiving a network-layer packet over SONET from the backbone network, the second header processor performs PPP encapsulation to generate a PPP data packet from the network-layer packet and the second AAL5-SAR section segments the PPP data packet into ATM cells to be forwarded to the first interface by the ATM switch.

8. The PPP termination device according to claim 6, wherein the PPP link controller comprises:
a third AAL5-SAR section; and
a processor,
wherein, when receiving the link control packet from the first interface through the third AAL5-SAR section, the processor generates a response control packet in response to the link control packet and the third AAL5-SAR section segments the response control packet into ATM cells to be forwarded to the first interface by the ATM switch.

9. An access network system comprising:
a plurality of subscriber computers;
a plurality of Remote ADSL Transceiver Units (ATU-Rs) each connected to the subscriber computers;
a plurality of Digital Subscriber Line Access Multiplexers (DSLAMs), each of which accommodates a plurality of ATU-Rs;
an access gateway to a backbone network, the access gateway accommodating a plurality of DSLAMs,
wherein the access gateway comprises:
a first interface to a corresponding Digital Subscriber Line Access Multiplexer (DSLAM);
a second interface to the backbone network;
a Point-to-Point Protocol (PPP) link controller for establishing and disconnecting a PPP link with an ATU-R;
a header processor for converting between a network-layer packet and a PPP data packet including the network-layer packet;
a switch for switching a connection among the first interface, the second interface, the PPP link controller, and the header processor, depending on which one of a PPP data packet and a link control packet is inputted, wherein the link control packet is used for link establishment and disconnection; and
a segmentation and reassembly section,
wherein the header processor is arranged and adapted to determine which one of a PPP data packet and a link control packet is inputted from the first interface and, when the link control packet has been inputted, the segmentation and reassembly section segments the link control packet into cells to be forwarded to the PPP link controller by the switch, wherein the PPP link controller performs a link establishment procedure based on the link control packet in the cells.

10. The PPP termination device of claim 9, wherein the header processor is further arranged and adapted so that when the PPP data packet has been inputted, the segmentation and reassembly section generates a network-layer packet by removing a PPP header from the PPP data packet and segments the network-layer packet into cells to be forwarded to the second interface by the switch.

* * * * *